US00RE45094E

(19) United States
(12) Reissued Patent
Berezin et al.

(10) Patent Number: US RE45,094 E
(45) Date of Reissued Patent: Aug. 26, 2014

(54) METHOD OF OPERATING A CMOS APS PIXEL SENSOR

(75) Inventors: Vladimir Berezin, La Crescenta, CA (US); Alexander I. Krymski, Pasadena, CA (US)

(73) Assignee: Round Rock Research, LLC, Jersey City, NJ (US)

(21) Appl. No.: 13/556,829

(22) Filed: Jul. 24, 2012
(Under 37 CFR 1.47)

Related U.S. Patent Documents

Reissue of:
(64) Patent No.: 7,230,645
Issued: Jun. 12, 2007
Appl. No.: 10/901,114
Filed: Jul. 29, 2004

U.S. Applications:
(60) Continuation of application No. 12/484,039, filed on Jun. 12, 2009, now abandoned, which is an application for the reissue of Pat. No. 7,230,645, which is a division of application No. 09/653,527, filed on Aug. 31, 2000, now Pat. No. 7,116,366.

(60) Provisional application No. 60/151,619, filed on Aug. 31, 1999.

(51) Int. Cl.
*H04N 3/14* (2006.01)
*H04N 5/335* (2011.01)

(52) U.S. Cl.
USPC ..... 348/308

(58) Field of Classification Search
USPC ..... 348/308, 302, 294; 250/208.1
See application file for complete search history.

(56) References Cited

U.S. PATENT DOCUMENTS

| | | | |
|---|---|---|---|
| 5,153,420 | A | 10/1992 | Hack et al. |
| 5,539,461 | A | 7/1996 | Andoh et al. |
| 5,614,744 | A | 3/1997 | Merrill |
| 5,869,857 | A | 2/1999 | Chen |
| 5,898,168 | A | 4/1999 | Gowda et al. |
| 5,900,623 | A | 5/1999 | Tsang et al. |
| 6,097,022 | A | 8/2000 | Merrill et al. |
| 6,211,510 | B1 | 4/2001 | Merrill et al. |
| 6,410,899 | B1 | 6/2002 | Merrill et al. |
| 6,423,994 | B1 | 7/2002 | Guidash |
| 6,512,543 | B1 | 1/2003 | Kuroda et al. |
| 6,535,247 | B1 | 3/2003 | Kozlowski et al. |
| 6,580,063 | B1 | 6/2003 | Okamoto |
| 6,603,513 | B1 | 8/2003 | Berezin |
| 6,618,083 | B1 | 9/2003 | Chen et al. |
| 6,950,131 | B1 | 9/2005 | Kleinhans et al. |
| 7,057,150 | B2 | 6/2006 | Zarnowski et al. |
| 7,116,365 | B1 | 10/2006 | Ueno et al. |
| 7,116,366 | B1 | 10/2006 | Berezin et al. |
| 7,116,368 | B2 | 10/2006 | Berezin et al. |
| 2001/0030704 | A1 | 10/2001 | Kimura |
| 2002/0001037 | A1 | 1/2002 | Miyawaki et al. |
| 2004/0141076 | A1 | 7/2004 | Ueno et al. |
| 2005/0041127 | A1 | 2/2005 | Ueno et al. |

*Primary Examiner* — Jason Whipkey
(74) *Attorney, Agent, or Firm* — Lerner, David, Littenberg, Krumholz & Mentlik, LLP

(57) ABSTRACT

A method of operating a CMOS imager is presented wherein a reset transistor source/drain of a first pixel is biased with a first voltage source, a source follower transistor of a second pixel is biased with the same first voltage source, a reset transistor source/drain of the second pixel is biased with a second voltage source, and the first voltage source is dropped to ground during a reset of the second pixel.

12 Claims, 3 Drawing Sheets

METHOD OF OPERATING A CMOS APS PIXEL SENSOR

Matter enclosed in heavy brackets [ ] appears in the original patent but forms no part of this reissue specification; matter printed in italics indicates the additions made by reissue.

CROSS-REFERENCE TO RELATED APPLICATIONS

[The present application is a divisional application of U.S. patent application Ser. No. 09/653,527, filed on Aug. 31, 2000, now U.S. Pat. No. 7,116,366, which claims the benefit of U.S. Provisional application No. 60/151,619, filed Aug. 31, 1999, the disclosure of which is incorporated herein by reference.] *This application is a continuation reissue of application Ser. No. 12/484,039, filed on Jun. 12, 2009 now abandoned, which is a reissue of application Ser. No. 10/901,114 filed Jul. 29, 2004 now U.S. Pat. No. 7,230,645, which is a divisional application of U.S. patent application Ser. No. 09/653,527, filed on Aug. 31, 2000, which issued as U.S. Pat. No. 7,116,366, which claims the benefit of U.S. Provisional application No. 60/151,619, filed Aug. 31, 1999, the disclosure of which is incorporated herein by reference.*

BACKGROUND

It is desirable to reduce the power consumption of an image sensor. It may also be desirable to reduce the magnitude, e.g., voltage, of the voltage supply that drives the image sensor. For example, this can allow more flexibility in battery operated applications.

Lowering the voltage, however, can lower the dynamic range of the sensor.

The voltage can be boosted internally.

SUMMARY

The present application defines increasing the pixel voltage dynamic range in a photosensor, such as an active pixel sensor. This is done by using two controlling lines to control each pixel. Each pixel line can have its own voltage, thereby enabling applying separate voltages to different parts of the pixel. By selectively controlling the voltages on the different parts, dynamic range boosting can be carried out.

*In accordance with one embodiment, a reset transistor source/drain of a pixel of a CMOS imager is biased with a voltage signal on a line that supplies the voltage signal to a row of pixels of the imager, and the voltage signal is lowered during operation of the imager.*

BRIEF DESCRIPTION OF THE DRAWINGS

These and other aspects will be described in detail with reference to the accompanying drawings, wherein.

DETAILED DESCRIPTION

Figure 1:
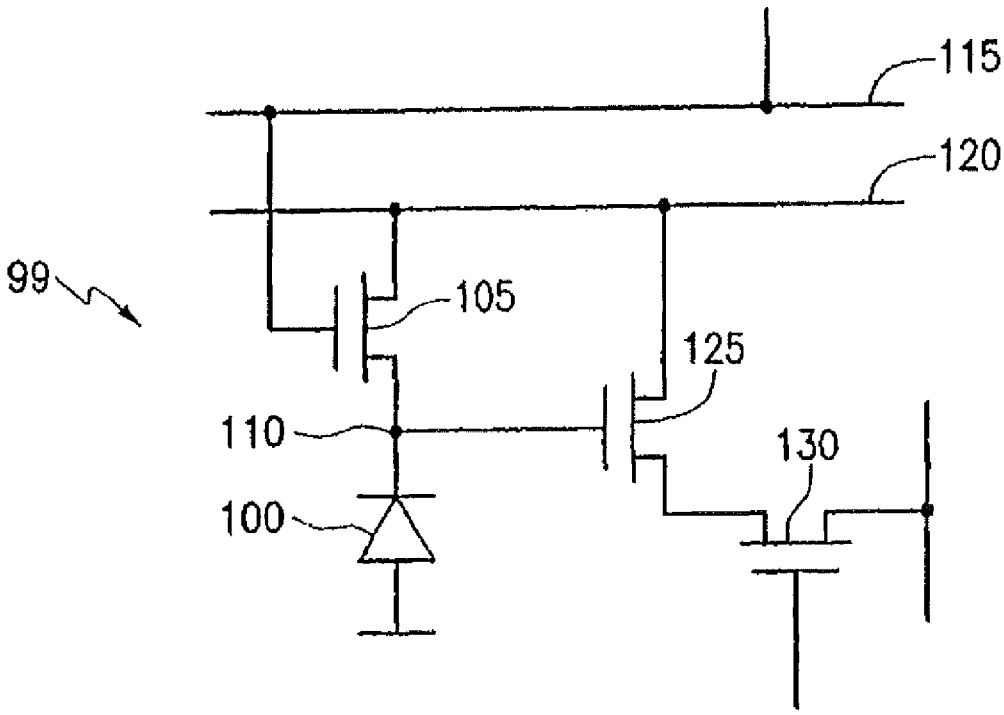
FIG. 1 (PRIOR ART)
FIG. 1 shows a basic active pixel sensor.

A single pixel of an active pixel sensor is shown in FIG. 1. An array of these active pixel sensor elements can be formed on a single chip and formed using transistors which are compatible with CMOS techniques. A photoreceptor, e.g. a photodiode 100 is formed in the substrate 99.

A first reset controlling line 115 controls a reset transfer gate 105 to reset the charge from the photodiode 100 based on a floating reset diffusion 110. The diffusion is either floating when gate 105 is off, or connected to line 120, when gate 105 is on.

When gate 105 is off, the value on the floating diffusion 110 represents the charge on the photodiode 100. This charge level is buffered by a follower transistor 125, and also switched by an in pixel select transistor 130. Additional pixels and circuitry may be also placed in the pixel as disclosed in U.S. Pat. No. 5,471,515.

All of the elements in this device can be formed from MOS and CMOS transistors. These transistors have a significant threshold voltage between 0.6 and 0.9 volts. The output voltages from the floating diffusion 110, the source follower transistor 125 and other voltages may be reduced or shifted downward by these thresholds.

For a supply voltage of 3.3 volts, the voltage on the floating diffusion may extend between 1.2 volts and 2.7 volts, e.g. the dynamic range may equal 1.5 volts. A boosted reset pulse may be used to increase the floating diffusion level, for example by 0.5 volts. This could correspondingly increase the signal dynamic range.

The present application teaches a way to expand dynamic range, maintain low dark current, and provide an operational mode in which quantum efficiency is increased by all the photodiode PN junctions in the pixel being kept near zero potential during the integration time. The improved pixel uses a combination of three different techniques for increasing its performance.

A first technique uses in-pixel boosting. In the present technique, the photodiode voltage only increases during the time of integration.

The channel of the pixel source follower is filled with charge during reset. The charge dumps from the channel into the drain during the readout time. The readout line is kept grounded during reset.

In a typical active pixel sensor circuit, this can result in a large current, since the drain on the source follower shares its VDD with the drain of the reset transistor.

The present system may separate the biases to switching elements (e.g. transistors), within a single pixel. This is done by using an additional metal line in each pixel. The circuit as described herein also uses a shared reset/select line which forms a reset for a first line, and a select for a different line. In this way the drain of the reset transistor for a specific pixel is separated from the drain of the source follower transistor for that pixel. By applying pulses to the transistors at different times, the power supplies can be effectively separated.

The VDD lines are run horizontally. As described herein, a special dynamic readout regime is used to minimize the DC current along that line, and thereby minimize voltage drop along that line.

Figure 2:
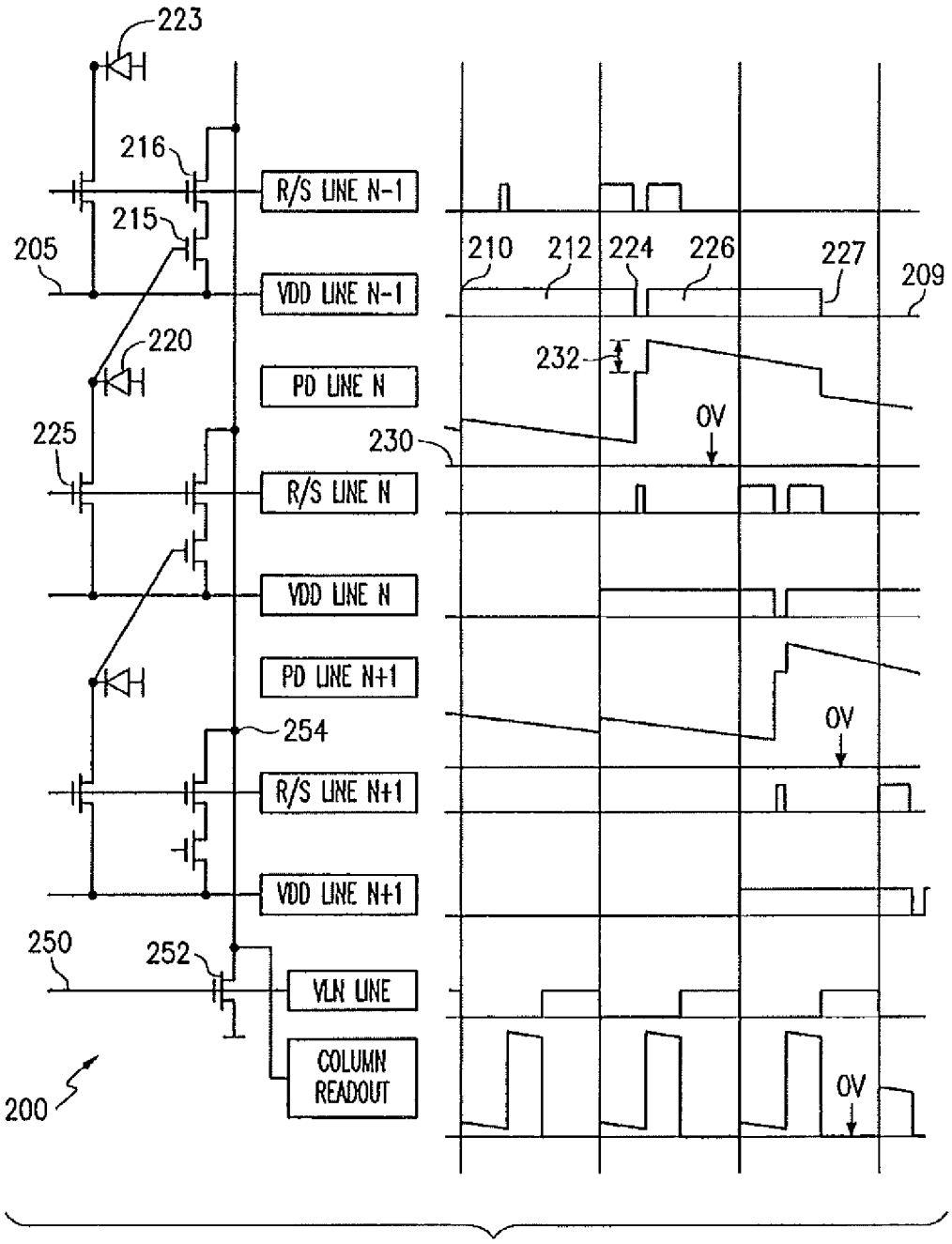
FIG. 2 shows the ways that the control lines are coupled to different parts of the circuits.
Figure 3:
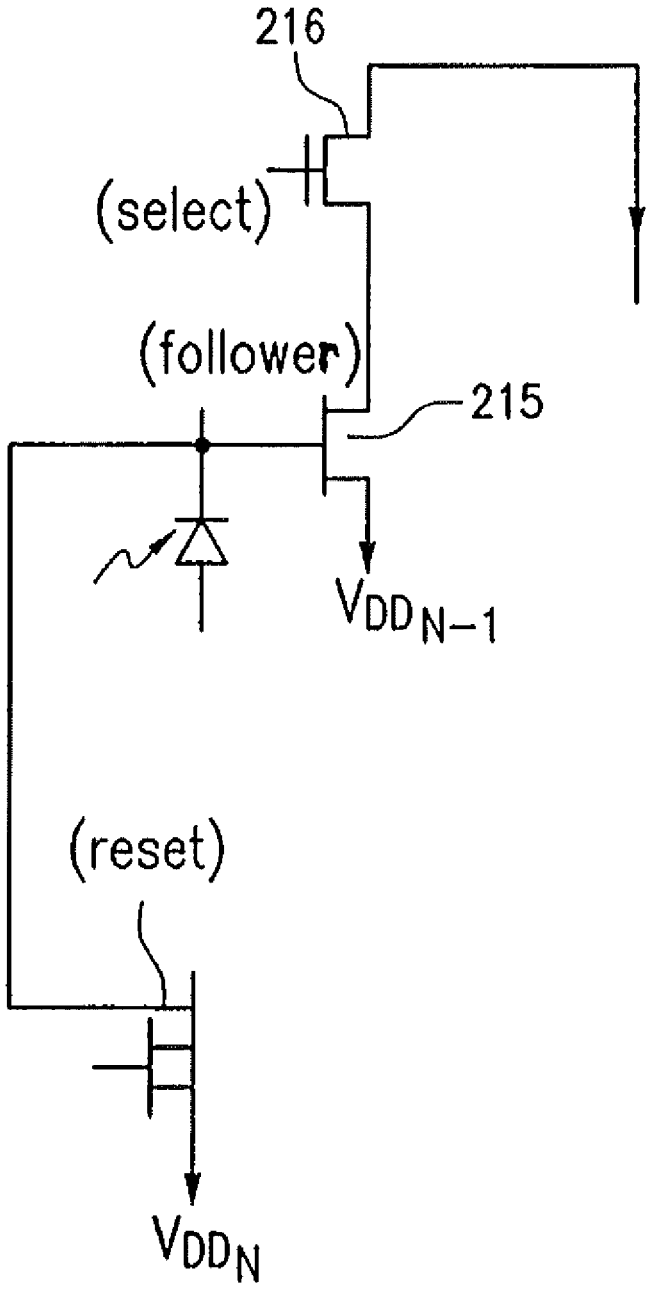
FIG. 3 shows a portion of the circuit of FIG. 2.

FIGS. 2 and 3 show an embodiment. An active pixel sensor circuit 200 is used which has special characteristics.

As shown in FIG. 2, the active pixel sensor circuit 200 has a plurality of bias lines extending through the circuit. In this special circuit, the number of horizontal lines is increased by a factor of two over the prior art active pixel sensor as described in U.S. Pat. No. 5,471,515. This system provides a $VDD_{N-1}$ line 205 for biasing the follower in each row of pixels and a separate reset/select line for the reset transistor in that row. This compares with prior systems in which the VDD potential was shared among all source follower and reset transistor drains.

Each VDD line, such as 205, is connected to two separate row drivers; here line N−1 and line N. As shown by waveform 209, this provides the VDD voltage only during the time of the two select pulses, i.e. during almost one row time. During the rest of the frame time, VDD remains grounded.

In operations, the $VDD_{N-1}$ line 205 first rises at 210. This boosts the voltage on the floating diffusion on line N. This also boosts the reset on line N−1 and also begins the first selecting pulse time period. During the second selecting pulse time 226, the VDD line raises the level on the source follower 215.

The gate of the source follower 215 for line N−1 is connected to the photodiode 220 for line N.

After signal sampling is completed, the voltage on VDD line N−1 drops to 0 at 224 during the reset time for photodiode 220 for line N−1. This means that the floating diffusion for that photodiode 220 will be charged to the reset level when the output column is grounded and the surface potential under the source follower gate is minimum. This may increase the cell capacitance.

After reset is completed, the voltage on the VDD line N−1 is raised again to begin the period 226. The surface potential under the source follower gate is then maximized, thereby minimizing the capacitance of the source follower gate.

Reference sampling then occurs during time period 226. At the end of the reference sampling, the voltage on VDD line n−1 drops down at 227 and remains low for the remainder of the frame period.

If the capacitances of the photodiode and of the source follower gate are approximately equal, then the pixel can be boosted by half of the potential swing under the source follower gate. This could reach 1 volt for VDD=3.3 volts and a typical reset boosting.

The line 230 shows the photodiode boosting that occurs. During the reset pulse, the output is boosted by an amount 232. Importantly, the drains of the reset transistor 225 and the source follower 215 for the same photodiode are connected to different VDD lines. The joint VDD contact for the reset transistor drain of one photodiode is connected to the source follower drain of another photodiode. For example, FIG. 2 shows the gate of source follower 215 being connected to the drain of the reset transistor 225 for a separate line. This layout can save pixel space, provide improved FF, quantum efficiency, and have a relatively small pixel pitch.

It could be undesirable to have a steady current from the VDD row driver to ground throughout the horizontal VDD line and vertical output column. In order to avoid this, a special dynamic source follower mode may be used. In FIG. 2, the bottom horizontal VLN line 250 is connected to a gate of a current sink transistor 252. This current sink transistor is turned on to provide a timed pulse (e.g. of 3.3 volts) instead of continuous DC voltage. This causes the transistors which are biased by the voltage line 254, which includes the transistors 215, 216 and corresponding transistors of other pixels, to operate as switches instead of steady state current generators. This also provides two column modes. An "on" mode connects the columns to ground and an "off" mode provides floating columns. In this way, all pixel source followers operate in a dynamic mode. This may increase the output source follower voltage by an extra 0.2 to 0.4 volts. It may keep the output columns at zero voltage for a part of the row period and cause them to float at readout/select time.

This system as described above can increase dynamic range, improve quantum efficiency, and reduce power consumption by reduction of the source follower static DC current.

Although only a few embodiments have been disclosed in detail above, other modifications are possible. All such modifications are intended to be encompassed within the following claims.

For example, other photoreceptors, such as photogates, pinned photodiodes, or other devices could be used. The photogate could require a separate transfer gate to be added.

What is claimed is:

1. A method of operating a pixel circuit, comprising:

biasing a reset transistor source/drain of a first pixel with a first voltage source on a first line;

biasing a source follower transistor source/drain of a second pixel with the first voltage source on the first line;

biasing a reset transistor source/drain of the second pixel with a second voltage source on a second line;

during a reset of the second pixel, dropping the first voltage source to ground; and controlling the reset transistor of the first pixel by a signal pulsed on a third line.

2. A method as in claim 1, wherein said resetting of the second pixel comprises pulsing a signal on a shared reset/select line connected to the gate of the reset transistor of the second pixel and a gate of a select transistor of a third pixel.

3. A method as in claim 1, further comprising:

raising the first voltage source during [the reset] *a reference* sampling of the second pixel.

4. A method as in claim 1, further comprising:

prior to said reset, reading out a pixel signal sample by pulsing a signal on a shared reset/select line connected to the gate of a select transistor of the second pixel and the gate of the reset transistor of the first pixel.

5. A method as in claim 1, further comprising:

subsequent to said reset, reading out a reference voltage by pulsing a signal on a shared reset/select line connected to the gate of a select transistor of the second pixel and the gate of the reset transistor of the first pixel.

*6. A method of operating a CMOS imager pixel sensor circuit, comprising:*

*biasing a reset transistor source/drain of a first pixel with a first voltage signal supplied to a first row of pixels;*

*biasing a source follower transistor source/drain of a second pixel, associated with a second row of pixels that at least partially overlaps the first row of pixels, with a voltage source on a first line;*

*biasing a reset transistor source/drain of the second pixel with a second voltage signal on a second line electrically isolated from the first line;*

*during operation of the pixel circuit, lowering the first voltage signal; and*

*controlling the reset transistor of the first pixel by a time-pulsed signal on a third line.*

*7. The method of claim 6, wherein the second voltage signal is different from the voltage source.*

*8. The method of claim 6, wherein the voltage source is the first voltage signal.*

*9. The method of claim 6, further comprising lowering the first voltage signal after sampling the first pixel and before sampling the second pixel.*

*10. The method of claim 6, further comprising providing a boosted voltage to a plurality of reset transistors of a plurality of pixels of the pixel circuit.*

*11. The method of claim 6 where the second voltage signal is the first voltage signal delayed by a period of time.*

*12. The method of claim 6 wherein the reset transistor source/drain of the first pixel is different from the reset transistor source/drain of the second pixel.*

* * * * *